US006651794B2

(12) United States Patent
Smith

(10) Patent No.: US 6,651,794 B2
(45) Date of Patent: Nov. 25, 2003

(54) HYDRO-MECHANICAL COMBINER

(75) Inventor: David P. Smith, Joliet, IL (US)

(73) Assignee: Caterpillar Inc, Peoria, IL (US)

(*) Notice: Subject to any disclaimer, the term of this patent is extended or adjusted under 35 U.S.C. 154(b) by 13 days.

(21) Appl. No.: 10/017,075

(22) Filed: Dec. 7, 2001

(65) Prior Publication Data
US 2003/0106764 A1 Jun. 12, 2003

(51) Int. Cl.[7] .............................................. F16D 25/06
(52) U.S. Cl. ............................. 192/59; 91/503; 92/71
(58) Field of Search ............................. 192/59; 91/503; 92/71

(56) References Cited

U.S. PATENT DOCUMENTS

| 2,370,640 A | * | 3/1945 | Deardorff et al. | 192/59 |
| 3,481,277 A | * | 12/1969 | Pettibone | 91/503 |
| 4,456,110 A | * | 6/1984 | Hanks et al. | 192/59 |
| 4,597,483 A | * | 7/1986 | Porel et al. | 192/59 |
| 4,611,529 A | * | 9/1986 | Stricker et al. | 91/503 |
| 4,794,756 A | * | 1/1989 | Iseman | 91/503 |
| 5,396,768 A | | 3/1995 | Zulu | |
| 5,545,098 A | | 8/1996 | Zulu | |
| 5,575,735 A | | 11/1996 | Coutant et al. | |
| 5,878,569 A | | 3/1999 | Satzler | |
| 6,422,368 B1 | * | 7/2002 | Sumino et al. | 192/59 |

* cited by examiner

Primary Examiner—Rodney H. Bonck
Assistant Examiner—Eric M. Williams
(74) Attorney, Agent, or Firm—J. W. Burrows; D James Barnes

(57) ABSTRACT

A power combining device is provide for use in a work system to combine mechanical power and hydraulic power. The power combining device includes a first rotatable input/output member connected to a power source, a second rotatable input/output member connected to a working member. A valving plate, a drive sleeve and a camplate are drivingly connected to the first rotatable input/output member. A rotating barrel having a plurality of piston disposed therein to define pressure chambers is drivingly connected to the second rotatable input/output member and operative in cooperation with the valving plate to control pressurized fluid within the pressurized chambers. The subject power combining device is compact and cost effective to produce.

15 Claims, 6 Drawing Sheets

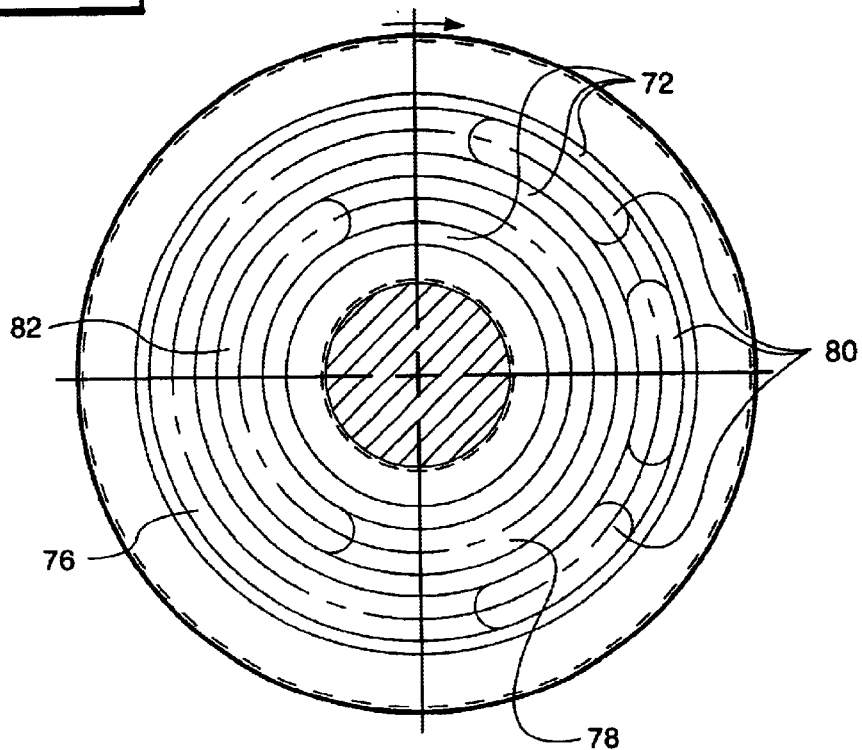
Fig-4-
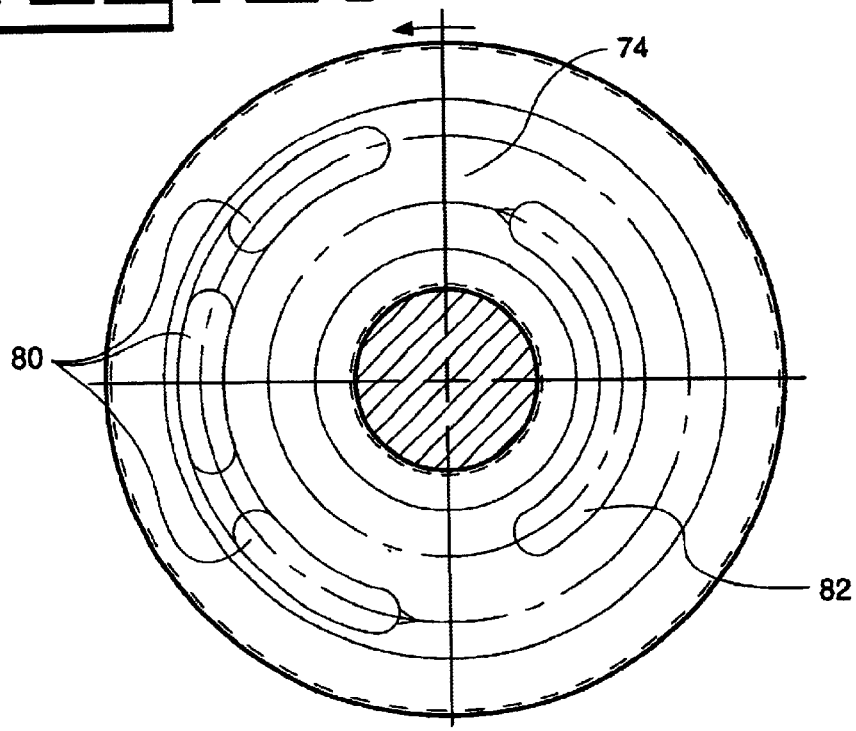
Fig-5-

FIG_6_
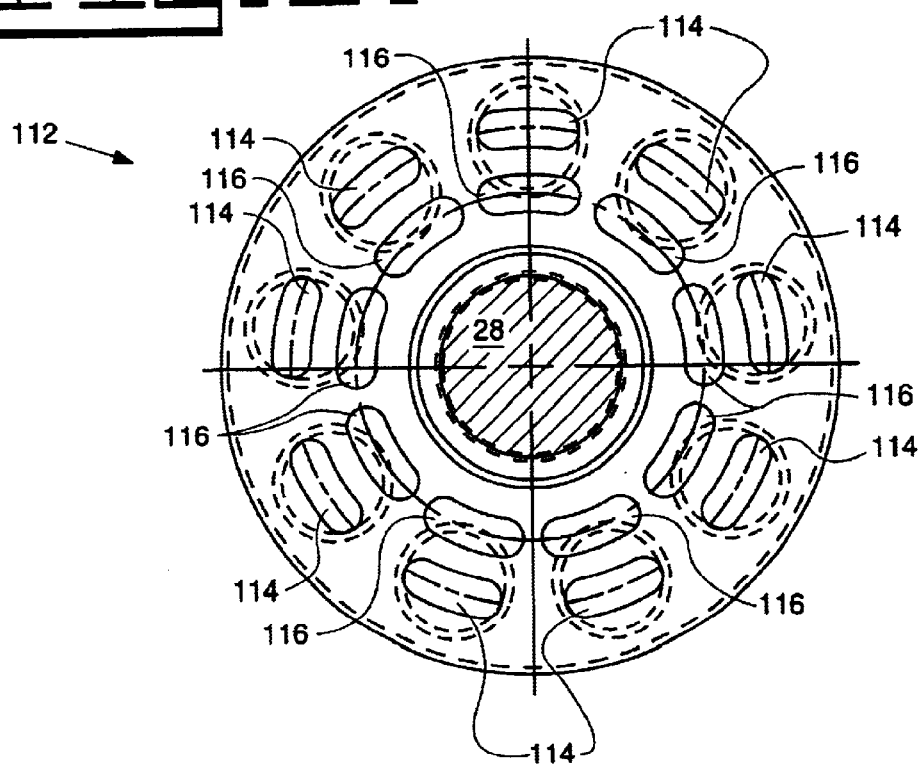
FIG_7_
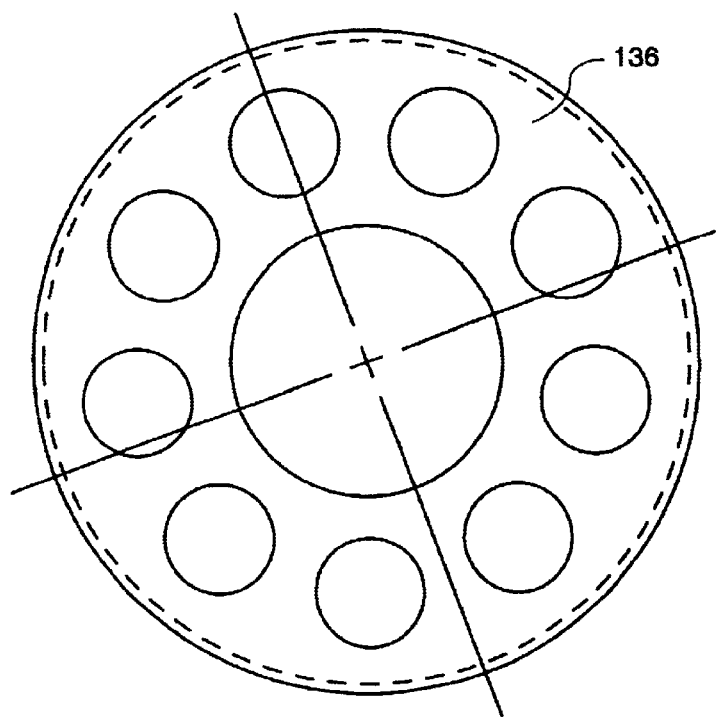

HYDRO-MECHANICAL COMBINER

TECHNICAL FIELD

This invention relates generally to a power combining mechanism and more particularly to a hydro-mechanical power combining mechanism and its use.

BACKGROUND

Power combining mechanisms are generally known in the art. Some are referred to as split torque mechanisms and function to combine the energies of a hydrostatic fluid unit in combination with a summing planetary gear arrangement. Even though these are effective units, they are many times more bulky and complex units, thus more costly. In order to reduce the cost, another known concept eliminates the summing planetary gear arrangement and rotates the entire fluid motor unit. In this arrangement, an external source of pressurized fluid is used to cause one portion of the fluid motor to proportionally rotate relative to the other portion of the fluid motor. This known concept, set forth in U.S. Pat. No. 5,396,768 issued on Mar. 14, 1995 to Joshua Zulu, creates other challenges, such as the rotating outer housing, the valving of pressurized fluid into the fluid motor, and keeping all of the components in true alignment with one another.

The subject invention is directed to overcome one or more of the problems set forth above.

SUMMARY OF THE INVENTION

In one aspect of the present invention a power combining device comprises first and second rotatable input/output members, first and second end members, a valving plate, a camplate, a rotating barrel, a plurality of piston assemblies, a drive sleeve and a cover member. The first and second rotatable input/output members are disposed in longitudinal alignment with one another and defines a reference axis extending longitudinally through both the first and second rotatable input/output members. The first end member has a face surface, first and second inlet/outlet ports communicating with the face surface, and a shaft bearing bore defined therethrough. The first input/output member is disposed within the shaft bearing bore of the first end member. The valving plate has first and second opposed faces with the first opposed face being in mating contact with the face surface of the first end member. The valving plate is disposed about the first input/output member and drivingly connected thereto. The second end member has a shaft bearing bore defined therethrough and the second input/output member is disposed in the shaft bearing bore of the second end member. The camplate has a reference plane defined therein perpendicular to the reference axis and a cam surface thereon disposed at an acute angle with respect to the reference plane. The camplate is disposed about the second input/output member and is located adjacent to the second end member. The rotating barrel has first and second end faces, a plurality of piston bores defined therein about the reference axis and each piston bore of the plurality of piston bores extend inward from the second end face generally along the reference axis and each bore communicates with the first end face thereof. The rotating barrel is disposed about and in driving engagement with the second input/output member. The plurality of piston assemblies slideably is disposed within the plurality of piston bores in the rotating barrel and defines a plurality of pressure chambers therebetween. The plurality of pistons is in mating contact with the cam surface of the camplate. The drive sleeve is disposed about the valving plate, the rotating barrel, the plurality of pistons, and the camplate and the drive sleeve is drivingly connected to the valving plate and the camplate. The cover member extends between and is sealingly connected to the first and second end members.

BRIEF DESCRIPTION OF THE DRAWINGS

FIG. 4 is a cross-sectional view taken a long the line 4—4 of FIG. 1;

FIG. 5 is a cross-sectional view taken a long the line 5—5 of FIG. 1;

FIG. 7 is a cross-sectional view taken a long the line 7—7 of FIG. 1; and

FIG. 8 is a part schematic and part diagrammatic representation of another work system incorporating the subject invention.

DETAILED DESCRIPTION

Figure 1:
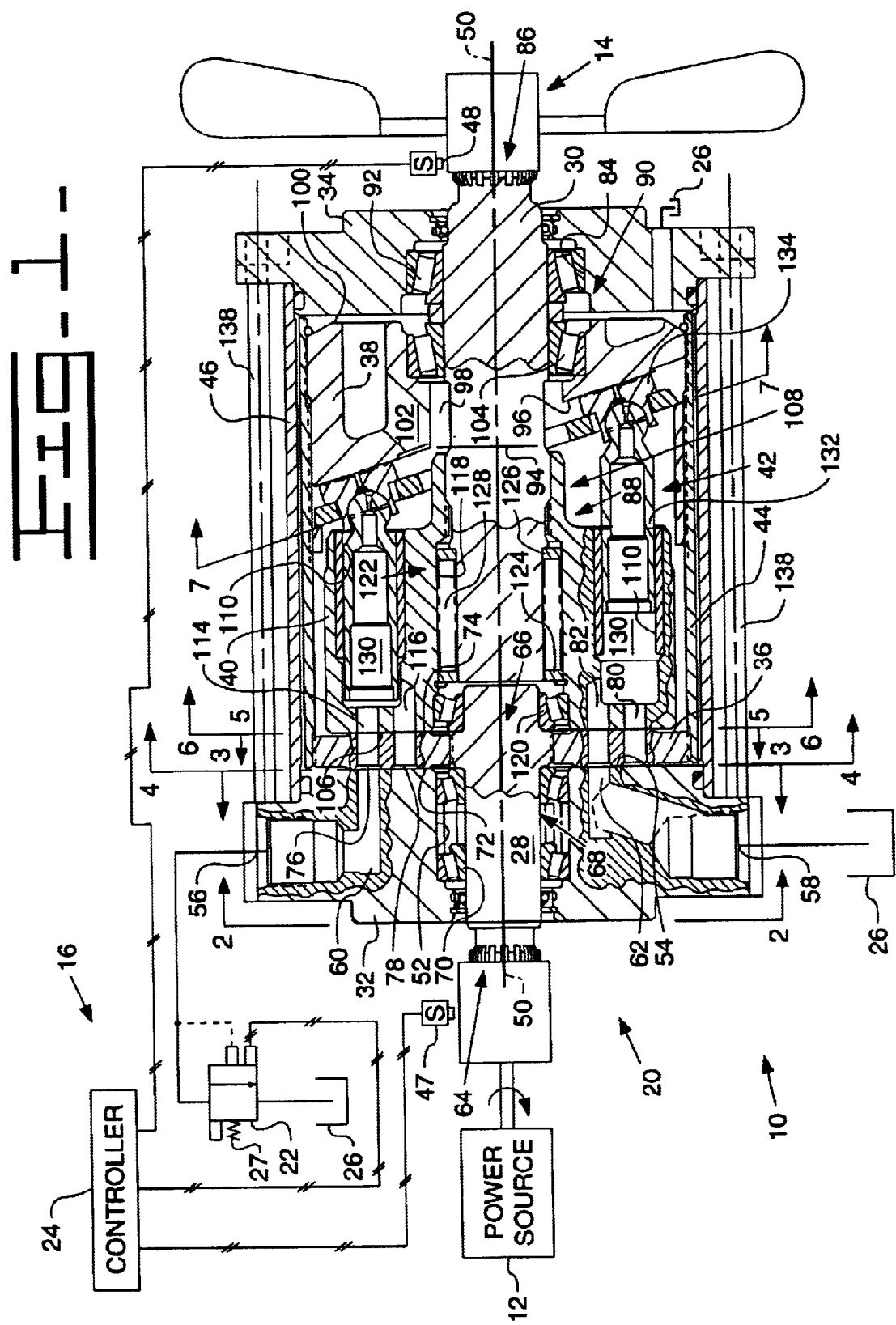
FIG. 1 is a part schematic and part diagrammatic representation of a work system incorporating an embodiment of the subject invention.
Figure 2:
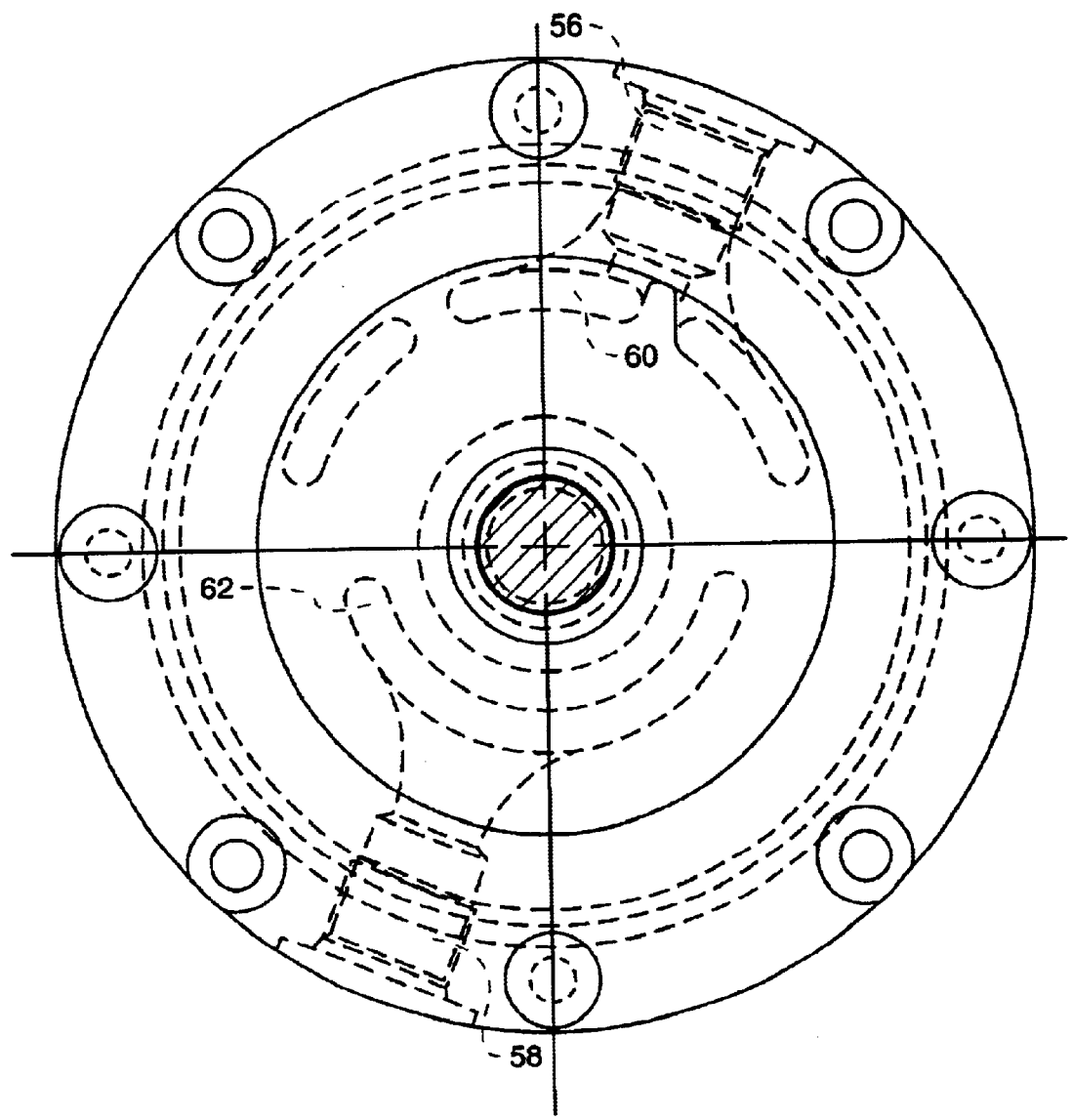
FIG. 2 is an end view taken along the line 2—2 of FIG. 1.
Figure 3:
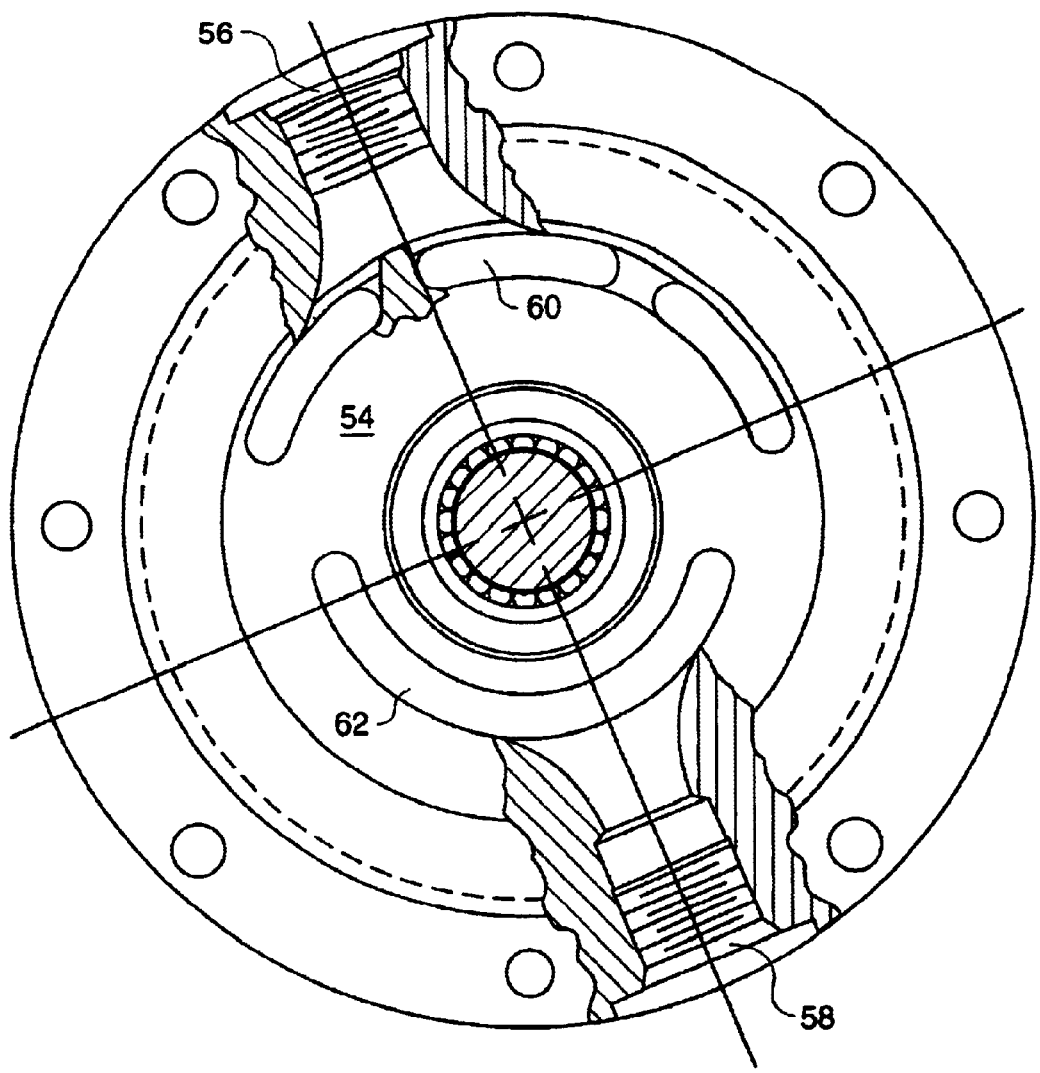
FIG. 3 is a cross-sectional view taken a long the line 3—3 of FIG. 1.
Figure 6:
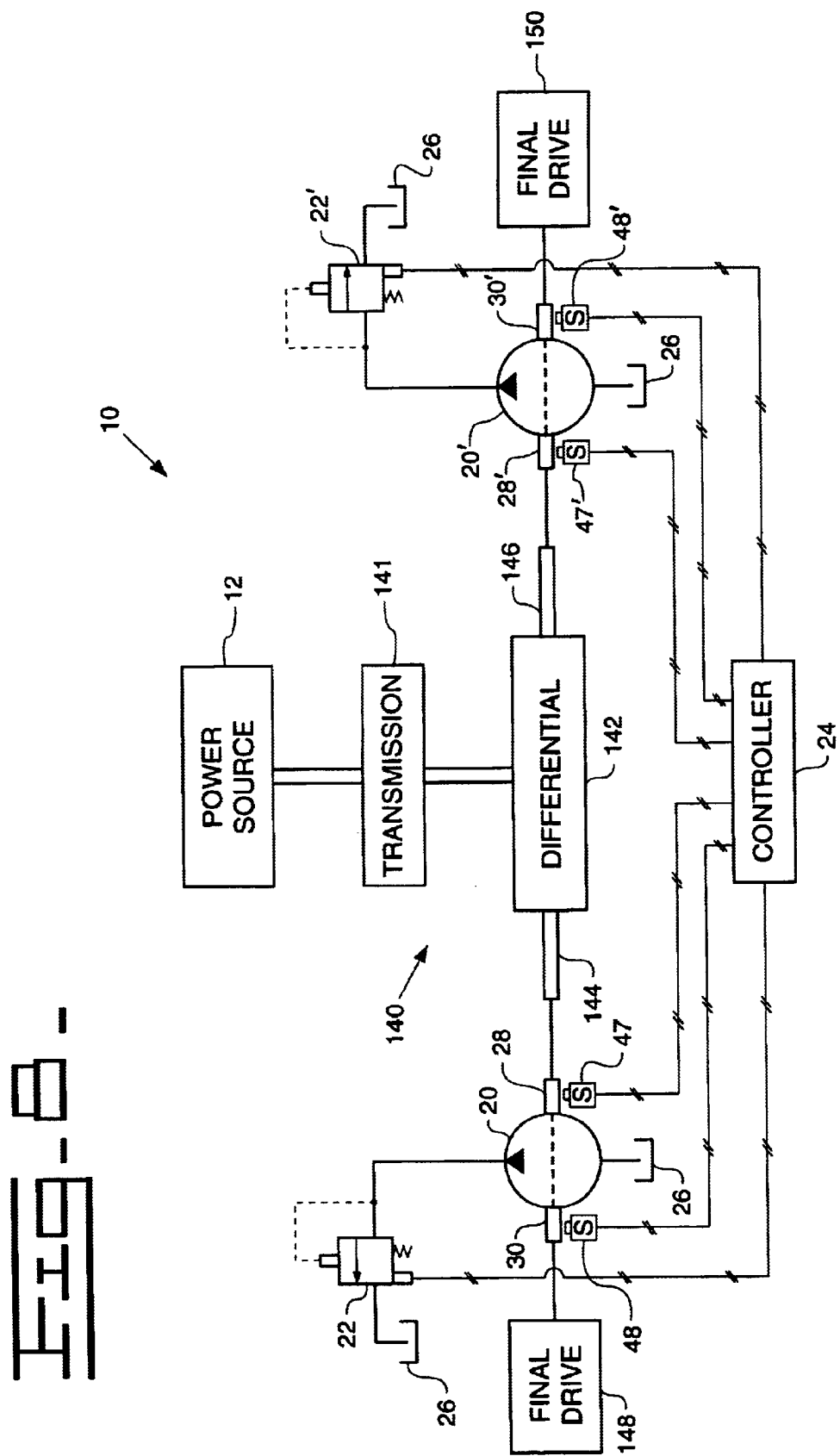
FIG. 6 is a cross-sectional view taken a long the line 6—6 of FIG. 1.

Referring to FIGS. 1–7 of the drawings, a work system 10 is illustrated in FIG. 1 and includes a power source 12, a working member, such as, a fan drive arrangement 14, a fluid system 16 and a power combining device 20. The fluid system 16 includes a flow/pressure control mechanism 22 operatively connected to a controller 24 and a reservoir 26. The flow/pressure control mechanism 22 is biased to a flow blocking position by a biasing member 27 and a variable signal from the controller 24 and movable to a flow passing position in response to pressurized fluid in the power combining device 20.

The power combining device 20 includes first and second rotatable input/output members 28,30, first and second end members 32,34, a valving plate 36, a camplate 38, a rotating barrel 40, a plurality of piston assemblies 42, a drive sleeve 44 and a cover member 46. First and second speed/direction sensors 47,48 are respectively disposed between the first and second rotatable input/output members 28,30 and the controller 24 and operative to sense the speed and direction of the respective rotatable input/output members 28,30 and deliver a signal representative of the speed and direction thereof to the controller 24. A reference axis 50 is defined longitudinally through the first and second rotatable input/output members 28,30.

The first end member 32 has a shaft bearing bore 52 defined therethrough parallel to the reference axis 50, a face surface 54, and first and second inlet/outlet ports 56,58. As illustrated in FIG. 1 and further clarified in FIGS. 2 & 3, the first and second inlet/outlet ports 56,58 have been revolved from their true positions for illustration purposes only. The first inlet/outlet port 56 is in communication with the face surface 54 through a first arcuate groove 60 as is more clearly illustrated in FIGS. 2 & 3. The first arcuate groove 60 is defined therein about the reference axis 50 and spaced therefrom a predetermined distance.

A second arcuate groove 62 is defined in the first end member 32 to connect the second inlet/outlet port 58 with the face surface 54 thereof. The second arcuate groove 62 is defined therein about the reference axis 50 and spaced therefrom a smaller distance than that of the first arcuate groove 60. At the face surface 54, the first and second arcuate grooves 60,62 are arcuately positioned 180 degrees from each other about the reference axis 50. It is recognized that they could be positioned at different locations about the reference axis 50.

The first rotatable input/output member 28 has first and second end portions 64,66 and a central portion 68. The first end portion 64 is connectable to the power source 12, the central portion 68 is disposed in the first end member 32 and the second end portion 66 is disposed adjacent to the shaft bearing bore 52 of the first end member 32 along the reference axis 50. A first shaft bearing assembly 70 is disposed in the first end member 32 between the shaft bearing bore 52 and the central portion 68 of the first rotatable input/output member 28.

The valving plate 36 has first and second opposed faces 72,74 and is drivingly disposed about the second end portion 66 of the first rotatable input/output member 28. The first opposed face 72 thereof is in mating contact with the face surface 54 of the first end member 32. A first ring groove 76 is defined in the valving plate 36 about the reference axis 50 and extends into the valving plate 36 from the first opposed face 72 thereof. The first ring groove 76 is located at a predetermined distance from the reference axis 50 and is in communication with the first arcuate groove 60 of the first end member 32.

A second ring groove 78 is also defined in the valving plate 36 about the reference axis 50 and extends into the valving plate 36 from the first opposed face 72 thereof. The second ring groove 78 is located at a smaller predetermined distance from the reference axis 50 and is in communication with the second arcuate groove 62 of the first end member 32.

The valving plate 36 has a first arcuate groove 80 defined therein about the reference axis 50 and extends from the second opposed face 74 thereof. The first arcuate groove 80 communicates with the first ring groove 76 defined in the first opposed face 72 and is spaced from the reference axis 50 at the same predetermined distance as the predetermined distance of the first ring groove 76. The first arcuate groove 80 has an arcuate length less than 180 degrees.

A second arcuate groove 82 is defined in the valving plate 36 about the reference axis 50 and extends from the second opposed face 74 thereof. The second arcuate groove 82 communicates with the second ring groove 78 defined in the first opposed face 72 and is spaced from the reference axis 50 at the same smaller predetermined distance as the predetermined distance of the second ring groove 78. The second arcuate groove 82 has an arcuate length less than 180 degrees. The first and second arcuate grooves 80,82 are arcuately disposed about the reference axis 180 degrees apart. It is recognized that the first and second arcuate grooves 80,82 could be at other relative positions about the reference axis 50.

The second end member 34 has a shaft bearing bore 84 defined therethrough. The second end member 34 is spaced from the first end member 32 and disposed about the reference axis 50.

The second rotatable input/output member 30 has first and second end portions 86,88 and a central portion 90. The first end portion 86 is connectable to the fan drive arrangement 14, the central portion 90 is disposed through the shaft bearing bore 84 of the second end member 34 and the second end portion 88 is disposed along the reference axis 50 between the first and second end members 32,34. The second end portion 88 of the second input/output member 30 terminates at a location generally adjacent the second end portion 66 of the first rotatable input/output member 28. A second shaft bearing assembly 92 is disposed in the shaft bearing bore 84 of the second end member 34 and about the central portion 90 of the second rotatable input/output member 30.

The drive sleeve 44 is drivingly connected about the valving plate 36 and extends at a location between the first and second end members 32,34. In the subject embodiment, the drive sleeve has a spline connection with the valving plate 36 but it is recognized that other known types of connections could be used. The camplate 38 has a reference plane 94 defined therein perpendicular to the reference axis 50 and is disposed about portions of both of the first and second input/output members 28,30 and the reference axis 50. A cam surface 96 is disposed on the camplate 38 at an acute angle with respect to the reference plane 94. The acute angle in the subject embodiment is approximately 17 degrees. It is recognized that it could be at various angles. A bore 98 is defined through the camplate 38 and an end face 100 is disposed thereon at a location opposed to and spaced from the cam surface 96. A cavity 102 is defined in the camplate 38 and extends both radially outward from the reference axis 50 and longitudinally along the reference axis 50 from a location generally at the intersection of the cam surface 96 and the bore 98 thereof to the end face 100 thereof. A bearing assembly 104 is disposed in the bore 98 of the camplate 38 and about the second rotatable input/output member 30 at a location generally adjacent to the end face 100 of the camplate 38. The camplate 38 is drivingly secured within the drive sleeve 44 at a location generally adjacent the second end member 34.

The rotating barrel 40 has first and second end faces 106,108 disposed thereon and a plurality of piston bores 110 defined therein extending inward from the second end face 108 thereof parallel with and disposed about the references axis 50. A plurality of formed cavities 112 are defined in the rotating barrel 40 between the respective ones of the plurality of piston bores 110 and the first end face 106 thereof. The first end face 106 of the rotating barrel 40 is in mating contact with the second opposed face 74 of the valving plate 36. A first portion 114 of the plurality of formed cavities 112 are in intermittent communication with the first arcuate groove 80 of the valving plate 36 and a second portion 116 of the plurality of formed cavities 112 are in intermittent communication with the second arcuate groove 82 of the valving plate 36.

The rotating barrel 40 has a bore 118 defined therethrough along the reference axis 50. At the end of the bore 118 generally adjacent the second end face 108 thereof, the rotating barrel 40 is drivingly secured to the second end portion 88 of the second input/output member 30. A bearing assembly 120 is disposed in the bore 118 of the rotating barrel 40 at the end thereof generally adjacent the first end face 106 thereof and disposed about the second end portion 66 of the first rotatable input/output member 28.

A spacer arrangement 122 is disposed within the bore 118 of the rotating barrel 40 between the bearing assembly 120 and the driving connection of the rotatable barrel 40 with the second rotating input/output member 30 and disposed about the second end portion 88 of the second input/output member 30 at a location generally adjacent the end thereof that is adjacent to the first rotatable input/output member 28. The spacer arrangement 122 includes first and second close fitting washers 124,126 spaced apart by a biasing member 128. The first and second close fitting washers 124,126 are disposed within the bore 118 of the rotating barrel 40 and disposed about the second end portion 88 of the second rotatable input/output member 30.

In the subject embodiment, each piston assembly 42 of the plurality of piston assemblies 42 includes a piston 132 and a piston shoe 134 pivotably attached thereto in a well known manner. The individual pistons 132 of the plurality of piston assemblies 42 are slideably disposed within the respective ones of the plurality of piston bores 110 in the rotating barrel 40 and form respective pressure chambers 130 therein in a well known manner. Each of the piston shoes 134 is in sliding contact with the cam surface 96 of the camplate 38 and held in contact therewith by a retainer plate 136. The retainer plate 136 is more clearly illustrated in FIG. 7.

The cover member 46 is sealingly disposed between and connected to the first and second end members 32,34 by a plurality of fasteners 138 in a conventional manner. The cover member 46 is disposed about the drive sleeve 44.

Referring to FIG. 8, another embodiment of a work system 10 utilizing the power combining device 20 is illustrated. All element numbers having a 'prime' attached thereto relates to corresponding elements. In the work system 10 of FIG. 8, the power source 12 is drivingly connected to a power transmitting arrangement 140 which includes a transmission 141 connected in a well known manner to a differential 142. As is well known, the differential 142 has first and second output shafts 144,146 extending therefrom. The first output shaft 144 is connected to the first rotatable input/output member 28 of the one power combining device 20 and the second input/output member 30 thereof is connected to a first final drive 148. Likewise, the second output shaft 146 is connected to the first rotatable input/output member 28' of the power combining device 20' and the second input/output member 30' thereof is connected to a second final drive 150. The remaining elements are the same as that set forth with respect to the work system 10 of FIG. 1.

It is recognized that various alternatives could be used in the subject power combining device 20 and that the power combining device 20 could be used in various types of work systems 10 without departing from the essence of the subject invention. For example, the transmission 141 of FIG. 8 could be a hydrostatic transmission or a power combining device 20 and the first and second final drives 148,150 could be wheels or gear arrangements connected to wheels. Likewise, the second rotatable input/output member 30 of FIG. 1 could be connected to any type of working member input. All of the bearing assemblies are illustrated as roller type bearing but it is recognized that other types of bearing could be used. Likewise, the plurality of piston assemblies 42 are described and illustrated as having well known pistons 132 and shoes 134. However, it is recognized that the plurality of piston assemblies 42 could be single unitary members. It is further recognized that the pressurized fluid delivered to the control mechanism 22 could be stored and recovered from a typical hydraulic circuit.

INDUSTRIAL APPLICABILITY

In the operation of the work system 10 of FIG. 1, the power source 12 delivers power to the first rotatable input/output member 28 urging it in the clockwise direction as illustrated. Simultaneously, the valving plate 36 turns since it is drivingly connected with the first rotatable input/output member 28. The valving plate 36 drives the drive sleeve 44 which in turn rotates the camplate 38. When the flow/pressure control mechanism 22 remains in the illustrated closed position, flow cannot exit the first inlet/outlet port 56. Consequently, the respective ones of the pressure chambers 130 that are filled with fluid cannot exhaust the fluid, therefore, the rotating barrel 40 is force to rotate at the same speed as the camplate 38. The fan drive arrangement 14 connected to the second rotatable input/output member 30 serves as a resistance to rotation but turns in response to rotation of the second rotatable input/output member 30.

The pressure of the fluid in the first inlet/outlet port 56 acts on the flow/pressure control mechanism 22 attempting to move it to a flow passing position. This movement is resisted by the force of the biasing member 27 and the variable force initiated by the controller 24. In order to vary the speed or torque on the fan drive arrangement 14, the controller 24 selectively varies the variable signal to the flow/pressure control mechanism 22 to reduce the force holding the flow/pressure control mechanism closed. As pressurized fluid is directed across the flow/pressure control mechanism 22, the rotating barrel 40 reduces in rotational speed relative to the speed of the camplate 38 thus permitting the speed of the fan drive arrangement 14 to simultaneously be reduced. The pressurized fluid from the pressurized chambers 130 is directed through the portion 114 of the formed cavities 112, the first arcuate groove 80 to the first ring groove 76 of the valving plate 36, and the arcuate groove 60 of the first end member 32 to the first inlet/outlet port 56 and on to the flow/pressure mechanism 22. The controller 24 continually senses the speed at the speed/direction sensors 47,48 to maintain a desired speed of the fan drive arrangement 14. As the valving plate 36 controllably directs pressurized fluid to the flow/pressure control mechanism 22, the valving plate 36 simultaneously permits fluid from the reservoir 26 to refill the pressure chambers 130 through the second inlet/outlet port 58, the second arcuate groove 62, the second ring groove 78 and second arcuate groove 82 of the valving plate 36, and through the portion 116 of the plurality of formed cavities 112 to the associated pressure chambers 130.

In the subject embodiment of FIG. 1, the speed of the fan drive arrangement 14 can be varied from a maximum speed to a zero speed. The spacer arrangement 122 disposed between the rotating barrel 40 and the second end portion 88 of the second input/output member 30 in cooperation with the bearing assembly 120 disposed between the rotating barrel 40 and the second end portion 66 of the first input/output member 28 serves to maintain the first end face 106 of the rotating barrel 40 in true perpendicular alignment with the reference axis 50 and thus in close mating contact with the second opposed face 74 of the valving plate 36. The true alignment between the first end face 106 of the rotating barrel 40 and the second opposed face 74 of the valving plate 36 aids in reducing fluid leakage at the interface therebetween. The first shaft bearing assembly 70 serves to maintain the alignment of the first input/output member 28 with respect to the reference axis 50 while the second shaft bearing assembly 92 in the second end member 34 in cooperation with the relationship of the spacer arrangement 122 and the bearing assembly 120 serve to keep the second rotatable input/output member 30 in alignment with the reference axis 50.

The cavity 102 acts as a scavenge pump to remove any leakage fluid from the area around the rotating barrel 40 and plurality of piston assemblies 42 and direct the leakage fluid to lubricate the bearing assembly 104 and the second shaft bearing assembly 92 and then to the reservoir 26.

Referring to the operation of the work system 10 of FIG. 8, the power source 12 delivers power through the transmission 141 and differential 142 and the respective output shafts 144,146 deliver power to the respective rotatable input members 28,28'. As long as the respective flow/pressure control mechanisms 22,22' remain closed, the speed of the respective second rotatable input/output members 30,30' remain the same as the respective first rotatable input/output members 28,28'. By lowering the variable signal from the controller 24 to the one of the flow/pressure control mechanism 22, the speed of the first final drive 148 is lowered relative to the speed of the second final drive 150. Likewise, by lowering the signal to the other flow/pressure control mechanism 22' and not changing the variable signal to the one flow/pressure control mechanism 22, the speed of the second final drive 22' is lowered relative to the speed of the first final drive arrangement 148. Consequently, if the first and second final drives 148,150 were connected to drives of a machine, the machine could be steered with this arrangement while maintaining drive power to both of the first and second final drives 148,150.

In view of the foregoing, it readily apparent that the subject power combining device 20 is both compact and rugged, thus making it cost effective to make and applicable to various work systems. By using the subject power combining device 20 in a fan drive arrangement 14, the speed and torque of the fan drive arrangement 14 can be closely controlled. Likewise by using two of the subject power combining devices 20 in a work system for a machine or the like, the machine can be easily steered in either direction while maintaining power to both of the drive units.

What is claimed is:

1. A power combining device, comprising:

first and second rotatable input/output members disposed in longitudinal alignment with one another and defining a reference axis extending longitudinally through both the first and second rotatable input/output members;

a first end member having a face surface, first and second inlet/outlet ports communicating with the face surface, and a shaft bearing bore defined therethrough, the first input/output member being disposed within the shaft bearing bore of the first end member;

a valving plate having first and second opposed faces with the first opposed face being in mating contact with the face surface of the first end member, the valving plate being disposed about the first input/output member and drivingly connected thereto;

a second end member having a shaft bearing bore defined therethrough and the second input/output member being disposed in the shaft bearing bore of the second end member;

a camplate having a reference plane defined therein perpendicular to the reference axis and a cam surface thereon disposed at an acute angle with respect to the reference plane, the camplate being disposed about the second input/output member and being located adjacent to the second end member;

a rotating barrel having first and second end faces, a plurality of piston bores defined therein about the reference axis, each piston bore of the plurality of piston bores extend inward from the second end face generally along the reference axis and each piston bore communicates with the first end face thereof, the rotating barrel being disposed about and in driving engagement with the second input/output member;

a plurality of piston assemblies slideably disposed within the plurality of piston bores in the rotating barrel and defines a plurality of pressure chambers therebetween and the plurality of pistons being in mating contact with the cam surface of the camplate;

a drive sleeve disposed about the valving plate, the rotating barrel, the plurality of pistons, and the camplate and the drive sleeve being drivingly connected to the valving plate and the camplate; and a cover member extended between and sealingly connected to the first and second end members.

2. The power combining device of claim 1, wherein the face surface of the first end member has a first arcuate groove defined therein spaced from and disposed about the reference axis and a second arcuate groove defined therein spaced from and disposed about the reference axis, the first arcuate groove is in communication with the first inlet/outlet port and the second arcuate groove is in communication with the second inlet/outlet port.

3. The power combining device of claim 2 wherein the first arcuate groove is spaced a predetermined distance from the reference axis and the second arcuate groove is spaced at a smaller predetermined distance from the reference axis.

4. The power combining device of claim 3 wherein the first opposed face of the valving plate has a first and second ring grooves defined therein about the reference axis, the first ring groove is spaced from the reference axis at a predetermined distance and the second ring groove is spaced from the reference axis at a smaller predetermined distance from the reference axis, the first ring groove is in communication with the first arcuate groove of the first member and the second ring groove is in communication with the second arcuate groove of the first member.

5. The power combining device of claim 4 wherein the second opposed face of the valving plate has a first arcuate groove defined therein about the reference axis and a second arcuate groove defined therein about the reference axis, the first arcuate groove communicates with the first ring groove in the first opposed face thereof and the second arcuate groove communicates with the second ring groove in the first opposed face thereof.

6. The power combining device of claim 5 wherein the respective pressure chambers defined in the rotating barrel are in selective communication with the first and second arcuate grooves defined in the second opposed face of the valving plate.

7. The power combining device of claim 1 wherein the second input/output member has first and second end portions and the rotating barrel has a bore defined therethrough and the rotating barrel is in driving engagement with the second input/output member generally adjacent the first end face, the second end portion of the second input/output member extends into the bore of the rotating barrel to a point short of the first end face thereof, a spacer arrangement is disposed within the bore of the rotating barrel and disposed about the second end portion of the second input/output shaft.

8. The power combining device of claim 7 wherein the spacer arrangement includes first and second close fitting washers separated by a biasing member.

9. The power combining device of claim 7 wherein the first input/output member has first and second end portions and the second end portion of the first input/output member extends into the bore of the rotating barrel adjacent the first end face thereof and a bearing assembly is disposed therein between the bore of the rotating barrel and the second end portion of the first input/output member.

10. The power combining device of claim 9 wherein the camplate has a bore defined therein and an end face disposed thereon at a location opposed to the cam surface and a bearing arrangement is disposed between the bore of the camplate and the second input/output member and a cavity is defined in the camplate extending both radially outward from and longitudinally with respect to the reference axis from a location adjacent to the cam surface and the bore to the end face thereof.

11. The power combining device of claim 10 including a first shaft bearing assembly disposed between the bore of the first member and the first input/output shaft and a second shaft bearing assembly disposed between the bore of the second member and the second input/output shaft.

12. The power combining device of claim 1 in combination with a work system having a power source connected to the first input/output member, a fan drive arrangement connected to the second input/output member and a fluid system connected to the power combining device.

13. The power combining device of claim 12 wherein the fluid system includes a flow/pressure control mechanism connected to the first inlet/outlet port and a reservoir connected to the second inlet/outlet port.

14. The power combining device of claim 1 used in a work system having a power source, a power transmitting arrangement, and first and second final drive arrangements, the power source being connected through the power transmitting arrangement and first and second ones of the power combining device to the respective first and second final drive arrangements.

15. The power combining device and work system of claim 14 including a fluid system connected to the respective ones of the power combining devices to selectively control the pressurized fluid therein.

* * * * *